(12) United States Patent  
Sasada et al.

(10) Patent No.: US 7,211,164 B2
(45) Date of Patent: May 1, 2007

(54) LAMINATION APPARATUS FOR CERAMIC GREEN SHEET AND LAMINATION METHOD

(75) Inventors: Kazuya Sasada, Sabae (JP); Hirokazu Misawa, Fukui (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/843,614

(22) Filed: May 12, 2004

(65) Prior Publication Data

US 2005/0000639 A1    Jan. 6, 2005

(30) Foreign Application Priority Data

May 13, 2003 (JP) .............................. 2003-134575
Mar. 12, 2004 (JP) .............................. 2004-070096

(51) Int. Cl.
 *B32B 38/04* (2006.01)
(52) U.S. Cl. ................... 156/261; 156/89.12; 156/263; 156/264; 156/512
(58) Field of Classification Search ................ 156/64, 156/89.11, 89.12, 89.16, 256, 260, 261, 264, 156/353, 512, 517, 520, 518; 29/851
See application file for complete search history.

(56) References Cited

U.S. PATENT DOCUMENTS 5,224,250 A * 7/1993 Hamuro et al. ............ 29/25.42
5,922,168 A * 7/1999 Zablotny et al. ............ 156/379
6,514,372 B1 * 2/2003 Yamazaki ................... 156/256
6,797,092 B2 * 9/2004 Sakamoto et al. ....... 156/89.12

FOREIGN PATENT DOCUMENTS

| JP | 2-158306 | * | 6/1990 |
| JP | 5-237829 | * | 9/1993 |
| JP | 7-1428 | * | 1/1995 |
| JP | 9-48019 | * | 2/1997 |
| JP | 10-71611 | * | 3/1998 |
| JP | 10-284346 | * | 10/1998 |
| JP | 2002-151350 | | 5/2002 |
| JP | 2003-017365 | | 1/2003 |
| JP | 2003-68566 | * | 3/2003 |

* cited by examiner

*Primary Examiner*—Melvin Mayes
(74) *Attorney, Agent, or Firm*—Keating & Bennett, LLP (57) ABSTRACT

In a method and apparatus for manufacturing ceramic green sheets, first and second long ceramic green sheets are selectively drawn out by means of first and second draw-out rollers into a commonly used punching station. In the punching station, predetermined areas of the long ceramic green sheets are punched, so that ceramic green sheet cut pieces having predetermined sizes are formed. A cut piece held by a punching head is conveyed to a lamination station adjacent to the punching station, where lamination and press-bonding are carried out.

20 Claims, 7 Drawing Sheets

LAMINATION APPARATUS FOR CERAMIC GREEN SHEET AND LAMINATION METHOD

BACKGROUND OF THE INVENTION

1. Field of the Invention

The present invention relates to a lamination apparatus and a lamination method for a ceramic green sheet and more particularly, the present invention relates to a lamination apparatus and a method of laminating a ceramic green sheet cut piece having a predetermined size which is formed by punching a long ceramic green sheet.

2. Description of the Related Art

For production of laminated ceramic electronic components, a process of laminating plural ceramic green sheets is carried out. In many cases, at least two kinds of ceramic green sheets are laminated in a lamination process. For example, for production of a laminated ceramic capacitor, ceramic green sheets having conductor films formed thereon, which function as internal electrodes for producing electrostatic capacitances, and ceramic green sheets having no conductor films formed thereon, which constitute outer layers, are laminated.

For example, Japanese Unexamined Patent Application Publication Nos. 2002-151350 (Patent Document 1) and 2003-17365 (Patent Document 2) disclose lamination apparatuses suitable for lamination of two kinds of ceramic green sheets as described above.

The lamination apparatus described in Patent Document 1 is formed so that two kinds of ceramic green sheets, i.e., a first ceramic green sheet and a second ceramic green sheet are processed. The lamination apparatus contains a lamination station in which ceramic green sheet cut pieces having a predetermined size formed by punching predetermined areas of the first and second ceramic green sheets are laminated, and first and second punching stations in which the first and second ceramic green sheets are punched, respectively. The first and second punching stations are arranged in opposition to each other via the lamination station.

Moreover, the lamination apparatus contains a punching head for cutting the first and second long ceramic green sheets so as to form cutting lines enclosing predetermined areas of the first and second ceramic green sheets, the punching head being movable to convey the cut pieces from the first or second punching station to the lamination station while holding the formed ceramic green sheet cut pieces.

Patent Document 1 describes the structure in which two punching heads are provided as the above-described punching head. The first punching head can be moved between the first punching station and the lamination station. The second punching head can be moved between the second punching station and the lamination station. The first and second punching heads can be simultaneously moved by rotation of one ball screw. Thereby, while one of the punching heads conducts the punching operation in one punching station, the other punching head can carry out the lamination operation of a ceramic green sheet cut piece in the lamination station. Thus, the cycle time for the lamination process can be reduced.

According to the lamination apparatus described in Patent Document 2, two kinds of ceramic green sheets are processed. One of the two kinds of ceramic green sheets is a long ceramic green sheet, and the other, which is not long, is a card-shaped ceramic green sheet.

Moreover, in the lamination apparatus described in Patent Document 1, only one punching head is provided, which is different from the lamination apparatus described in Patent Document 1. This punching head punches a long ceramic green sheet or a card-shaped ceramic green sheet to form a ceramic green sheet cut piece having a predetermined size in the working station. Also, the punching head has a function to laminate the punched ceramic green sheet cut piece. The long ceramic green sheet and the card-shaped ceramic green sheet are conveyed from their opposite positions into the above-described working station for the punching head.

However, the lamination apparatuses described in patent Documents 1 and 2 have the following problems to be solved.

That is, in the lamination apparatus described in Patent Document 1, the first and second punching stations are arranged in opposition to each other via the lamination station. Thus, the ball screw for driving the punching head must have a length such that the screw can extend at least from the first punching head to the second punching head. Thus, the ball screw must be long, so that the inertial moment of the mechanism for causing the movement of the punching head becomes large. The punching head is unsuitable for high speed movement. Thus, the reduction of the cycle time has a limit.

Moreover, in the lamination apparatus described in Patent Document 1, the cost of the punching head is relatively high. Thus, when two punching heads are provided, the cost of the whole lamination apparatus becomes high.

In the case where the ceramic green sheet cut pieces formed by punching the first long ceramic green sheet, and the ceramic green sheet cut pieces formed by punching the second long ceramic green sheet are alternately laminated one by one, for example, the lamination process can be efficiently carried out, since the two punching heads are provided.

However, in the case where the ceramic green sheet cut pieces formed by punching only one kind of the long ceramic green sheets are laminated in succession many times, i.e., in the case where fifty ceramic green sheet cut pieces formed by punching the first ceramic green sheet are laminated, and thereafter, fifty ceramic green sheet cut pieces formed by punching the second ceramic green sheet are laminated, only one punching head is required during this particular time period. Therefore, the constitution having two punching heads is not necessarily suitable for the above-described use.

For example, for production of laminated ceramic capacitors, ceramic green sheet cut pieces formed by punching a long ceramic green sheet having no conductor film formed thereon are laminated in succession a plurality of times, and thereafter, ceramic green sheet cut pieces formed by punching a long ceramic green sheet having a conductor film formed thereon are laminated in succession a plurality of times. Thus, the constitution having two punching heads is not necessarily effective for a highly efficient lamination process.

On the other hand, the lamination apparatus described in Patent Document 2 is provided with only one punching head, and moreover, the punching head is used for lamination of ceramic green sheet cut pieces thereon. Thus, the problems which the lamination apparatus described in Patent Document 1 encounters, i.e., a limit in reduction of the cycle time and the relatively high cost of the whole lamination apparatus can be solved.

However, one of the ceramic green sheets which are processed with the lamination apparatus described in Patent Document 2 must be a card-type. Accordingly, with this lamination apparatus, two kinds of long ceramic green sheets can not be processed.

To carry out the punching operation with one punching head in one working station, as conducted with the lamination apparatus described in Patent Document 2, while two kinds of long ceramic green sheets are processed as conducted with the lamination apparatus described in Patent Document 1, a mechanism is required by which two kinds of long ceramic green sheets can be selectively supplied to one working station, without interfering with each other. However, it has been difficult to realize this mechanism.

SUMMARY OF THE INVENTION

In order to overcome the problems described above, preferred embodiments of the present invention provide a lamination apparatus for a ceramic green sheet and a lamination method which can solve the above-described problems.

A lamination apparatus according to a preferred embodiment of the present invention includes one punching station adapted to punch a predetermined area of a long ceramic green sheet, and thus, form a ceramic green sheet cut piece having a predetermined size and one lamination station being positioned adjacent to the punching station and adapted to lamination of the ceramic green sheet cut piece, as working stations provided in fixed positions.

The lamination apparatus has a structure such that a plurality of different types of long ceramic green sheets are processed as the long ceramic green sheet.

Moreover, the lamination apparatus according to a preferred embodiment of the present invention preferably includes one punching head which cuts each long ceramic green sheet so as to form a cutting line enclosing the predetermined area thereof, and holding the formed ceramic green sheet cut piece and conveying the piece from the punching station to the lamination station, a feeding mechanism for feeding the long ceramic green sheets in the longitudinal direction, respectively, and an introducing mechanism for introducing the long ceramic green sheet into the punching station.

Although a plurality of different types of long ceramic green sheets are processed, only one punching station is required for punching the long ceramic green sheets. Thus, only one punching head is required. The cost of the lamination apparatus can be reduced compared to such an apparatus having two punching heads.

Moreover, the lamination station is positioned adjacently to the punching station. Thus, although a plurality of different types of long ceramic green sheets are processed, the movement route of the punching head can be reduced. Therefore, the inertial moment can be reduced. The punching head is suitable for high speed movement, and the cycle time can be decreased.

Preferably, the introducing mechanism is provided with a draw-out roller which is moved so as to draw out the long ceramic green sheet to the punching station with holding the long ceramic green sheet on the peripheral surface thereof.

Advantageously, the introduction mechanism having a simple structure can be realized. The draw-out roller can function as means for releasing a carrier film lining the ceramic green sheet when the draw-out roller is caused to recede from the punching station. That is, the draw-out roller can be caused to recede from the punching station while the carrier film is wound along the peripheral surface thereof. Thus, the release of the carrier film occurs from one-side end of the ceramic green sheet cut piece. Accordingly, the carrier film can be smoothly released.

Also, preferably, the lamination apparatus further includes plural punching stages which are positioned on the back side in the draw-out direction of the draw-out roller and are moved together with the draw-out roller, and are positioned in opposition to the punching head via the long ceramic green sheets, when the draw-out rollers are moved so as to draw out the long ceramic green sheets to the punching station, respectively.

Accordingly, when the ceramic green sheet is punched, a member for supporting the ceramic green sheet can be arranged to avoid interfering with the drawing-out operation of the draw-out roller and the long ceramic green sheet.

Also, preferably, as the long ceramic green sheet, first and second long ceramic green sheets are processed, the draw-out roller includes a first draw-out roller for drawing out the first long ceramic green sheet and a second draw-out roller for drawing out the second long ceramic green sheet, the punching stage includes a first punching stage which is moved together with the first draw-out roller, and a second punching stage which is moved together with the second draw-out roller, the first and second draw-out rollers are movable in the X-axial direction passing through the punching station, and the punching head is movable in the Y-axial direction perpendicular to the X-axial direction.

Thus, it is unnecessary to provide a special mechanism for correction of the punching position in the X- and Y-axial directions. The positional correction in the X-axial direction can be performed by adjustment of the feeding amount in the longitudinal direction of the long ceramic green sheet and the position of the punching stage. The positional correction in the Y-axial direction can be performed by adjustment of movement amount of the punching head.

Preferably, the feeding mechanism includes a first upstream-side fixed roller provided in a fixed position to guide the first long ceramic green sheet on the upstream side of the first punching stage, and a first downstream-side fixed roller provided in a fixed position to guide the first long ceramic green sheet on the downstream side of the first punching stage, and a second upstream-side fixed roller provided in a fixed position to guide the second long ceramic green sheet on the upstream side of the second punching stage, and a second downstream-side fixed roller provided in a fixed position to guide the second long ceramic green sheet on the downstream side of the second punching stage, a first guide roller which is arranged so that the first long ceramic green sheet is always wound along the first upstream-side roller and the first downstream-side fixed roller, and is moved within the space defined between the first upstream-side fixed roller and the first downstream-side fixed roller while the positional relationship between the first draw-out roller and the first punching state is kept constant, and a second guide roller which is arranged so that the second long ceramic green sheet is always wound along the second upstream-side roller and the second downstream-side fixed roller, and is moved within the space defined between the second upstream-side fixed roller and the second downstream-side fixed roller while the positional relationship between the second draw-out roller and the second punching state is kept constant.

Since the first and second long ceramic green sheets can be always wound along the first and second upstream-side fixed rollers and the first and second downstream-side fixed rollers, tension applied to the long ceramic green sheets can be stabilized. As a result, the long ceramic green sheet can be punched and laminated at high accuracy. Moreover, the mechanisms for introducing the long ceramic green sheet and causing the green sheet to recede from the punching station can be arranged so as not to interfere with each other.

Alternately, the punching station may be positioned in the boundary between the space which is defined between the first upstream-side fixed roller and the first downstream-side fixed roller, and the space which is defined between the second upstream-side fixed roller and the second downstream-side fixed roller.

In the former case, preferably, the punching station may be positioned within the space defined between the first upstream-side roller and the first downstream-side roller. The first and second draw-out rollers are held on the first and second punching stages, respectively, the first punching stage can be moved by rotation of a first ball screw passing through a first bracket extending from the center portion in the main surface direction thereof, and the second punching stage can be moved by rotation of a second ball screw passing through a second bracket extending from the center portion in the side direction thereof.

In this case, preferably, the first long ceramic green sheet has a conductor film formed thereon, and the second long ceramic green sheet has no conductor film formed thereon.

Advantageously, the first ball screw and the second ball screw can be arranged so as not to interfere with each other.

Moreover, in this case, for the first punching stage, of which the movement is suppressed from being influenced with the moment, is suitable for high speed movement. Also, the stopping accuracy can be enhanced. Accordingly, the positional accuracy of the first long ceramic green sheet processed on the first punching stage can be enhanced. Thus, when the first long ceramic green sheet has a conductor film formed thereon, the positional accuracy of the conductor film can be enhanced.

Preferably, the first guide roller is positioned between the first draw-out roller and the first punching stage, and the positional relationship between the first guide roller and the first draw-out roller is selected such that the winding-along angles of the first long ceramic green sheet at the first guide roller and the first draw-out roller are larger than 180°, respectively.

In this case, slippage between the first long ceramic green sheet and the first guide roller and that between the first long ceramic green sheet and the first draw-out roller can be suppressed. Especially, the not-engaged rotation of the rollers, which tends to occur when the speed is increased or reduced while high speed moving, can be suppressed. Thus, the lamination apparatus has a structure that is suitable for high speed movement. The not-engaging rotation of the rollers causes the stopping accuracy of the long ceramic green sheet to decrease and causes the sheet to be distorted due to the variation of the tension. Thus, the accuracy of the punching and the lamination is reduced. Accordingly, the suppression of the not-engaging rotation enhances the accuracy of punching and lamination.

In the case where the punching station is positioned in the boundary between the space defined between the first upstream-side fixed roller and the first downstream-side fixed roller, and the space defined between the second upstream-side fixed roller and the second downstream-side fixed roller, the first mechanism for processing the first long ceramic green sheet and the second mechanism for processing the second long ceramic green sheet can be formed so as to have a symmetrical structure. Accordingly, the first and second mechanisms can be designed in common, and parts common to the first and second mechanisms can be used.

Also, preferably, the lamination apparatus further includes a camera fixedly disposed to sense the cut-position of the long ceramic green sheet introduced in the punching station. The camera can be disposed independently of the punching head in the punching station. Thus, sensing with the camera can be carried out when the punching head is in the lamination station, and consequently, positional correction or data-processing for the positional correction can be performed before the punching head is returned to the punching station. Thus, the punching process can be performed with very high efficiency. Moreover, since the camera is fixedly provided, vibration, e.g., caused by the punching head, can be prevented from being applied to the camera. Thus, image picking-up with the camera can be carried out with very high precision. Moreover, the punching head does not hold the camera. Thus, the weight of the punching head can be reduced.

According to various preferred embodiments of the present invention, a method of laminating a ceramic green sheet includes the steps of introducing each of a plurality of different types of long ceramic green sheets into one punching station, punching a predetermined area of the long ceramic green sheet and thus forming a ceramic green sheet cut piece having a predetermined size on the punching station, conveying the ceramic green sheet cut piece from the punching station to the lamination station, and laminating the ceramic green sheet cut piece in the lamination station.

Other features, elements, steps, characteristics and advantages of the present invention will become more apparent from the following detailed description of preferred embodiments thereof with reference to the attached drawings.

DETAILED DESCRIPTION OF THE PREFERRED EMBODIMENTS

Figure 1A:
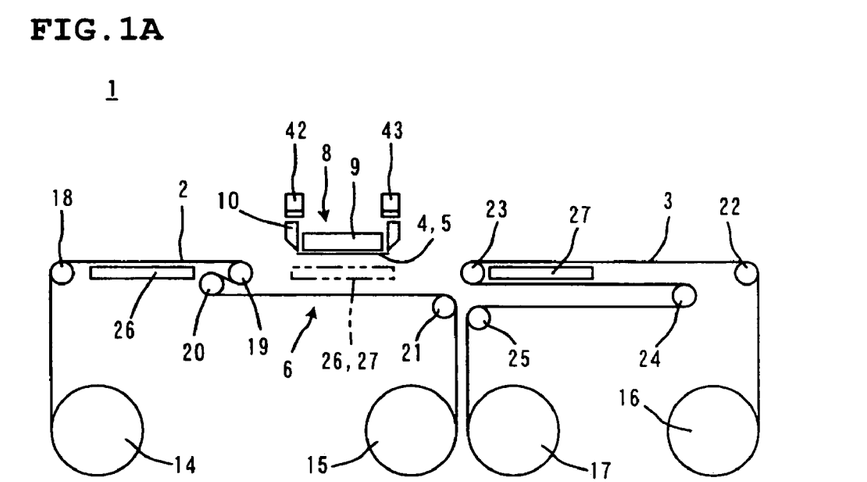
FIGS. 1A to 1C are front views schematically showing the structure of a lamination apparatus 1 for a ceramic green sheet according to a first preferred embodiment of the present invention, in which typical examples of the operation of the lamination apparatus 1 are illustrated, respectively.
Figure 1B:
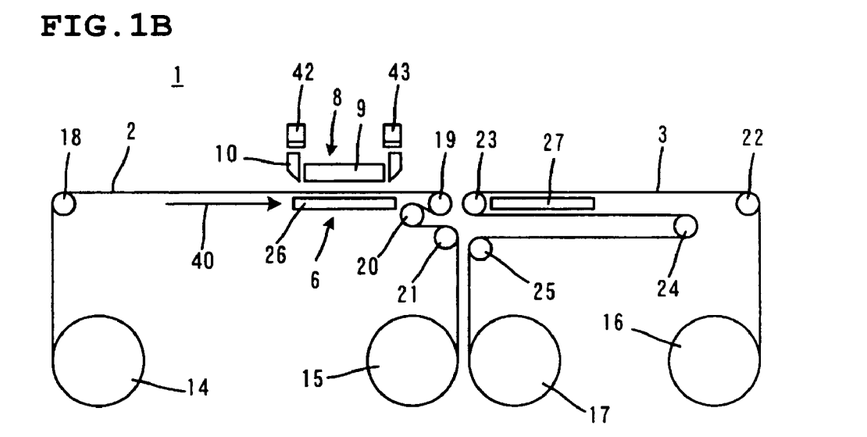
Figure 1C:
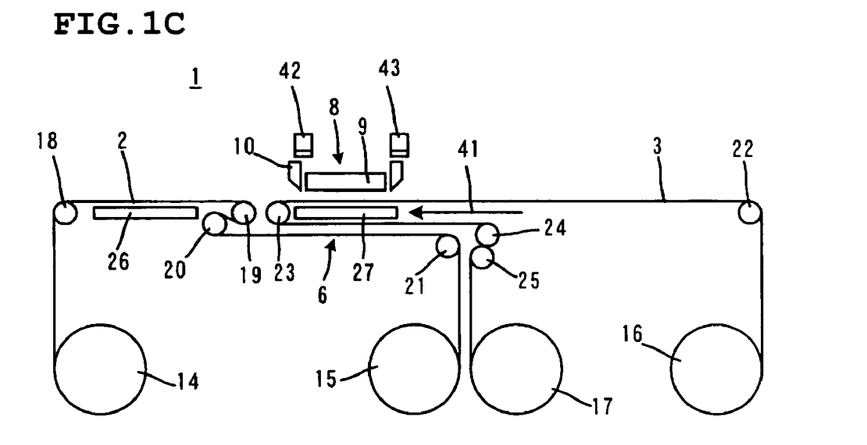
Figure 2:
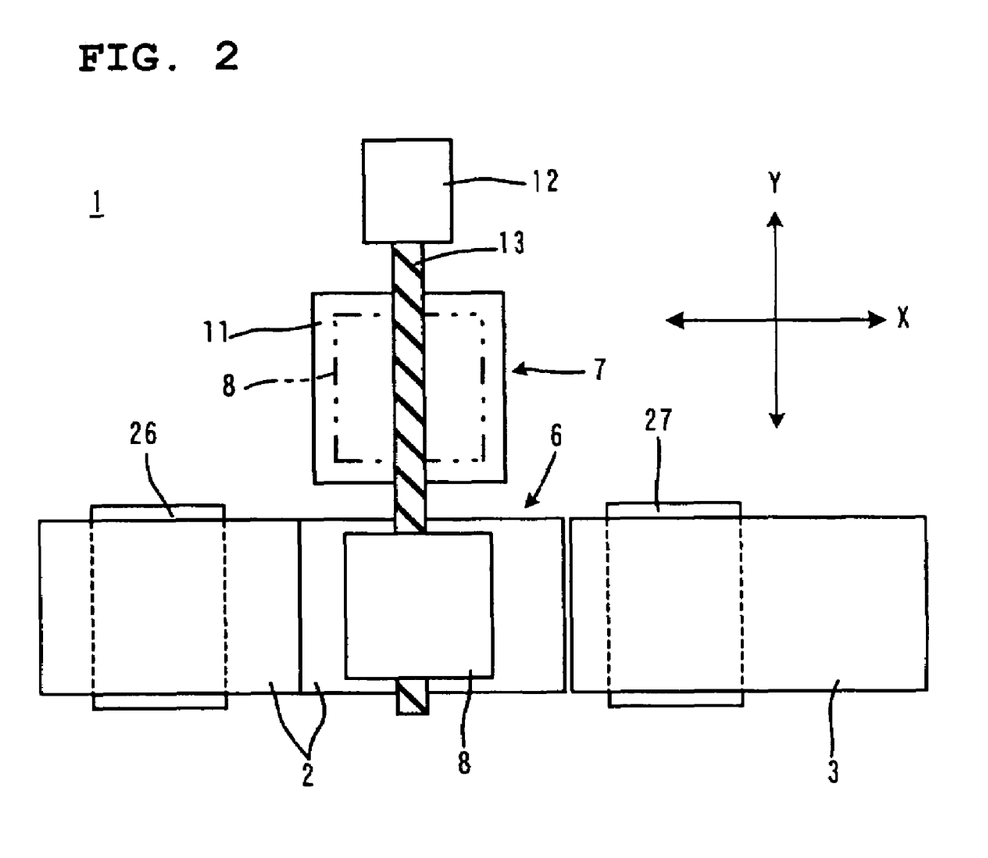
FIG. 2 is a plan view schematically showing the structure of the lamination apparatus 1 of FIGS. 1A to 1C.

FIGS. 1A to 1C are front views schematically showing the structure of a lamination apparatus 1 for laminating ceramic green sheets according to a first preferred embodiment of the present invention. FIGS. 1A, 1B, and 1C show typical examples of the operation of the lamination apparatus 1, respectively. FIG. 2 is a plan view schematically showing the structure of the lamination apparatus 1 shown in FIG. 1.

The lamination apparatus 1 of this preferred embodiment has a structure such that several different types of long ceramic green sheets, i.e., in this preferred embodiment, two types of long ceramic green sheets, i.e., first and second long ceramic green sheets 2 and 3 can be processed. In the case in which the lamination apparatus 1 is applied to production of a laminated ceramic capacitor, the first long ceramic green sheet 2 preferably has a conductor film formed thereon to define an internal electrode. The long second ceramic green sheet 3 is preferably used as an outer layer, and is not provided with a conductor film. These long ceramic green sheets 2 and 3 are preferably made of dielectric ceramic powder. The long ceramic green sheets 2 and 3 are processed with the lamination apparatus 1 while they are lined with carrier films (not shown in FIGS. 1A to 1C and 2).

The lamination apparatus 1 is provided with one punching station 6 and one lamination station 7 (see FIG. 2). In the punching station 6, ceramic green sheet cut pieces 4 and 5 (shown in FIG. 1A) having predetermined sizes are formed by punching the long ceramic green sheets 2 and 3 at predetermined positions thereof. The lamination station 7 is arranged adjacent to the punching station 6, and is provided for the lamination of the ceramic green sheet cut pieces 4 and 5. The punching station 6 and the lamination station 7 are working stations provided in fixed positions.

The lamination apparatus 1 is provided with one punching head 8. In the punching station 6, the long ceramic green sheets 2 and 3 are cut with the punching head 8 so as to form cutting lines enclosing predetermined areas of the sheets 2 and 3, respectively. The formed ceramic green sheet cut pieces 4 and 5, while they are held by the punching head 8, are conveyed from the punching station 6 to the lamination station 7 with the punching head 8, respectively.

As schematically shown in FIGS. 1A to 1C, the punching head 8 includes a holding block 9 for holding each of the ceramic green sheet cut pieces 4 and 5 using vacuum-suction, and a cutting blade 10 arranged so as to surround the holding block 9.

The whole of the punching head 8 can be moved in the Y-axial direction shown in FIG. 2, and moreover, can be moved in the vertical direction. Referring to the movement in the vertical direction, the punching head 8, when it is moved in the Y-axial direction, is set in the upper position. On the other hand, the punching head 8, when it is operated to cut and hold the ceramic green sheet cut pieces 4 and 5 in the punching station 6, and also, when the punching head 8 is operated to laminate and press-bonding the ceramic green sheet cut pieces 4 and 5 in the punching station 6, the punching head 8 is set in the lower position.

Moreover, the cutting blade 10 is held movably in the vertical direction independently of the holding block 9. When the cutting blade 10 is operated to cut, the edge thereof is caused to protrude downward from the lower surface of the holding block 9. On the other hand, when the cutting operation is achieved, the cutting blade 10 is moved upward with respect to the holding block 9. The protrusion degree of the edge of the cut blade 10 under the cutting operation is adjusted so that the blade can form the cutting lines passing through the long ceramic green sheets 2 and 3 in the thickness directions, and can be prevented from cutting the carrier films, respectively.

As shown in FIG. 2, the lamination station 7 is provided with a lamination stage 11 which can be moved in the vertical direction by means of a hydraulic cylinder or the like (not shown). The movement of the punching head 8 in the Y-axial direction between the punching station 6 and the lamination station 7 is carried out, e.g., by a ball screw 13 which is rotated by a servomotor 12.

The lamination apparatus 1 has first and second feeding mechanisms for feeding the long ceramic green sheets 2 and 3 in the longitudinal direction, respectively. According to this preferred embodiment, the first feeding mechanism has a first unwinding roller 14 for unwinding and feeding the long ceramic green sheet 2 wound in a roll-shape and a first take-up roller 15 for winding the long ceramic green sheet 2 into a roll-shape. Similarly, the second feeding mechanism has a second unwinding roller 16 for unwinding and feeding the second long ceramic green sheet 3 wound in a roll-shape, and a second take-up roller 17 for winding the second long ceramic green sheet 3.

The first unwinding roller 14 and the take-up roller 15 are driven so as to rotate synchronized with each other. The respective rotational angles are adjusted so that the tension of the first long ceramic green sheet 2 becomes constant. Similarly, the second unwinding roller 16 and the take-up roller 17 are driven so as to rotate synchronized with each other. The respective rotational angles are adjusted so that the tension of the second long ceramic green sheet 3 becomes constant.

The first long ceramic green sheet 2 unwound from the first unwinding roller 14 is fed and sequentially wound around the peripheral surfaces of a first upstream-side fixed roller 18, a first draw-out roller 19, a first guide roller 20, and a first downstream-side fixed roller 21, which are rotatably supported, respectively, and thereafter, is wound around the first take-up roller 15. The first upstream-side fixed roller 18 and the first downstream-side fixed roller 21 constitute a part of the first feeding mechanism.

Moreover, the second long ceramic green sheet 3 unwound from the second unwinding roller 16 is fed and sequentially wound around the peripheral surfaces of a second upstream-side fixed roller 22, a second draw-out roller 23, a second guide roller 24, and a second downstream-side fixed roller 25, which are rotatably supported, respectively, and thereafter, is wound around the second take-up roller 17. The second upstream-side fixed roller 22 and the second downstream-side fixed roller 25 constitute a part of the second feeding mechanism.

A first punching stage 26 is arranged under the first long ceramic green sheet 2 existing between the first upstream-side fixed roller 18 and the first draw-out roller 19. The first upstream-side fixed roller 18 is provided in a fixed position to guide the first long ceramic green sheet 2 upstream of the first punching stage 26. The first downstream-side fixed roller 21 is provided in a fixed position to guide the first long ceramic green sheet 2 downstream of the first punching stage 26.

Moreover, a second punching stage 27 is arranged under the second long ceramic green sheet 3 existing between the second upstream-side fixed roller 22 and the second draw-out roller 23. The second upstream-side fixed roller 22 is provided at a fixed position to guide the second long ceramic green sheet 3 upstream of the second punching stage 27. The second downstream-side fixed roller 25 is provided at a fixed position to guide the second long ceramic green sheet 3 downstream of the second punching stage 27.

The first punching stage 26 is constructed so as to be moved together with the first draw-out roller 19 and the first guide roller 20 while the first punching stage 26 is positioned on the back side in the drawing-out direction of the first draw-out roller 19. Moreover, the second punching stage 27 is constructed so as to be moved together with the second draw-out roller 23 and the second guide roller 24 while the second punching stage 27 is positioned on the back side in the drawing-out direction of the second draw-out roller 23.

Figures 3A, 3B:
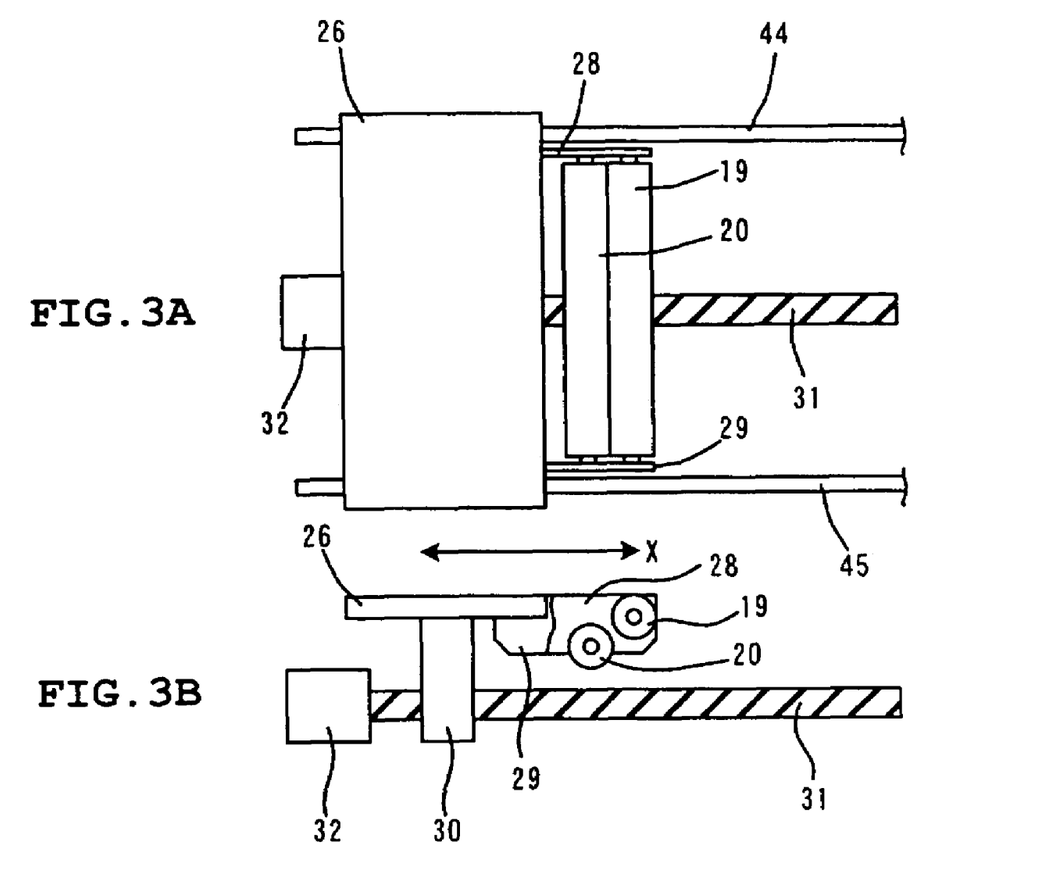
FIG. 3A is a front view showing the configuration of a first punching stage 26, a first draw-out roller 19, a first guide roller 20, and relevant members which are shown in FIGS. 1A to 1C.
FIG. 3B is a partially fragmentary front view showing the above-described configuration.

FIG. 3A is a plan view showing the configuration of the first punching stage 26, the first draw-out roller 19, the fist guide roller 20, and the relevant members. FIG. 3B is a partially fragmentary front view of the configuration.

Referring to FIGS. 3A and 3B, the first draw-out roller 19 and the first guide roller 20 are held by the first punching stage 26 via brackets 28 and 29. Moreover, a first bracket 30 is provided for the first punching stage 26 and extends from the central portion of the main surface of the first punching stage 26. A first ball screw 31 is arranged so as to pass through the first bracket 30. The first bracket 30 is rotated by a servomotor 32, and thereby, the first punching stage 26 is moved together with the first draw-out roller 19 and the first guide roller 20 along guide rails 44 and 45 in the X-axial direction perpendicular to the Y-axial direction.

Figure 4:
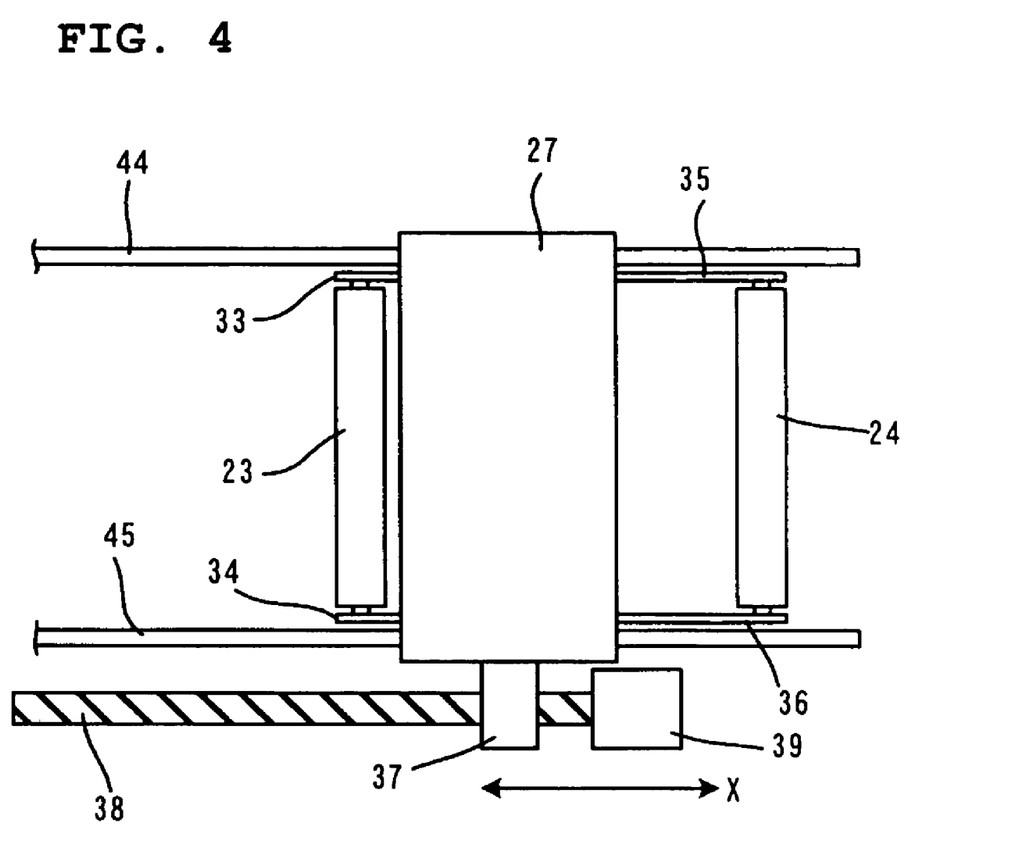
FIG. 4 is a plan view showing the configuration of a second punching stage 27, a second draw-out roller 23, a second guide roller 24, and relevant members which are shown in FIGS. 1A to 1C.

Referring to FIG. 4, the second draw-out roller 23 is held by the second punching stage 27 via brackets 33 and 34. The second guide roller 24 is held by the second punching stage 27 via brackets 35 and 36. Moreover, a second bracket 37 is provided for the second punching stage 27 and extends in the side direction thereof. A second ball screw 38 is arranged so as to pass through the first bracket 30. The second ball screw 38 is rotated by a servomotor 39, and thereby, the second punching stage 27 is moved together with the second draw-out roller 23 and the second guide roller 24 along the guide rails 44 and 45 in the X-axial direction.

As described above, the second ball screw 38 is arranged so as to pass through the second bracket 37 extending in the side direction of the second punching stage 27. This is because the second ball screw 38 is prevented from interfering the first ball screw 31 shown in FIGS. 3A and 3B.

The lamination apparatus 1 has a first introducing mechanism and a second introducing mechanism. The first introducing mechanism is provided for introduction of the first long ceramic green sheet 2 into the punching station 6 as shown in FIG. 1B. The second introducing mechanism is provided for introduction of the second long ceramic green sheet 3 into the punching station 6 as shown in FIG. 1C. The first draw-out roller 19 and the second draw-out roller 23 which is moved as described above with reference with FIGS. 3A and 3B and 4 constitute the first introducing mechanism and the second introducing mechanism, respectively.

That is, the first draw-out roller 19 is moved in the direction shown by arrow 40, while it holds the first long ceramic green sheet 2 on the peripheral surface thereof, so that the first long ceramic green sheet 2 is drawn out in the longitudinal direction and positioned onto the punching station 6. Then, the first punching stage 26 is positioned so as to be opposed to the punching head 8 via the first long ceramic green sheet 2.

On the other hand, the second draw-out roller 23 is moved in the direction shown by arrow 41, while it holds the first long ceramic green sheet 2 on the peripheral surface thereof, so that the second long ceramic green sheet 3 is drawn out in the longitudinal direction and positioned onto the punching station 6, as shown in FIG. 1C. Then, the second punching stage 27 is arranged so as to be opposed to the punching head 8 via the second long ceramic green sheet 3.

According to the illustrated preferred embodiment, each of the first draw-out roller 19 and the second draw-out roller 23 includes one roller, and however, may include plural rollers, e.g., plural small rollers.

Moreover, as shown in FIGS. 1A to 1C, the lamination apparatus 1 may preferably be provided with cameras 42 and 43 for sensing the positions of the first long ceramic green sheet 2 and the second ceramic green sheet 3 in which they are to be cut, respectively. The cameras 42 and 43 pick up the images of positioning marks (not shown) provided on the first long ceramic green sheet 2 and the second ceramic green sheet 3 introduced in the punching station 6, respectively. The image data obtained by the image pick-up is processed, and thereby, correct cutting positions of the first long ceramic green sheets 2 and 3 are determined.

Referring to correction for the appropriate cutting positions, the correction in the X-axial direction can be achieved by driving of the first unwinding roller 14 and the first take-up roller 15 or by driving of the second unwinding roller 16 and the second take-up roller 17. The correction in the Y-axial direction can be achieved by driving the servomotor 12 so that the movement amount of the punching head 8 in the Y-axial direction is controlled.

According to this preferred embodiment, the two cameras 42 and 43 are positioned so as to be opposed to each other via a punching area. Thus, the correction in the θ direction can be carried out, e.g., by rotation of the punching head 8 in the θ direction.

Also, as described above, in this preferred embodiment, the second ceramic green sheet 3 has no conductor film formed thereon. Thus, a very high accuracy is not required with respect to the cutting position. Accordingly, in this case, it is not necessary to sense the cutting positions of the second long ceramic green sheet 3 with the cameras 42 and 43.

Hereinafter, the operation of the lamination apparatus 1 will be described in reference to the case in which a laminate for use as a laminated ceramic capacitor is produced with the lamination apparatus 1.

FIG. 1A shows the initial state of the lamination apparatus 1. In this state, the first and second draw-out rollers 19 and 23 are in the waiting positions. The first and second first long ceramic green sheets 2 and 3 are not introduced in the punching station 6. Moreover, the punching head 8 is positioned in the lamination station 7 as shown by an imaginary line in FIG. 2.

For production of a laminate for use as a laminate ceramic capacitor, first, a ceramic green sheet having no conductor film formed thereon is laminated. For this purpose, the second ceramic green sheet 3 having no conductor film formed thereon is introduced together with the second draw-out roller 23 in the direction shown by arrow 41 toward the punching station 6. At this time, the second guide roller 24 and the second punching stage 27 are also moved together with the second draw-out roller 23.

Simultaneously with or after the introduction of the second ceramic green sheet 3 as described above, the second unwinding roller 16 and the second take-up roller 17 are driven, so that the second ceramic green sheet 3 is fed by one pitch. For the purpose of feeding the second ceramic green sheet 3 as described above, the second punching stage 27 may have a function of suction-holding the second ceramic green sheet 3. Thus, the second ceramic green sheet 3 may be fed accompanying the second punching stage 27.

Thereafter, the cut position of the second ceramic green sheet 3 is sensed with the cameras 42 and 43, and the position of the second ceramic green sheet 3 is corrected, if necessary. The second ceramic green sheet 3, having no conductor film formed thereon, does not need to be strictly positioned. Thus, the sensing with the cameras 42 and 43 and the positional correction as described above may be omitted.

Subsequently, the punching head 8 is moved to a position above the punching station 6, and then, is moved downward. Thereby, a cutting line enclosing a predetermined area of the second ceramic green sheet 3 is formed with the cut blade 10.

Then, the second draw-out roller 23 is restored together with the second punching stage 27 to the waiting position shown in FIG. 1A. Thereby, the second ceramic green sheet 3 recedes from the punching station 6.

At this time, the second draw-out roller 23 and the second guide roller 24 are integrally moved while the distance between them is kept constant. Thus, the movement in the longitudinal direction of the second ceramic green sheet 3 does not occur substantially. In other words, the length of the second ceramic green sheet 3 between the second unwinding roller 16 and the second take-up roller 17 is not changed substantially, and only the shape of the route of the second ceramic green sheet 3 is changed.

In the above-described operation, a ceramic green sheet cut piece 5 (see FIG. 1A) is held with a holding block 9 provided for the punching head 8. The carrier film is released from the ceramic green sheet cut piece 5, so that the ceramic green sheet cut piece 5 remains on the punching head 8 side. At this time, the carrier film is wound around the peripheral surface of the second draw-out roller 23. Thus, the release of the carrier film starts from the one-side end of the ceramic green sheet cut piece 5 while the second draw-out roller 23 is moved. Thus, the release of the carrier film can be smoothly carried out.

Referring to the operation of the second guide roller 24, the second guide roller 24 is moved in such a range that the second guide roller 24 does not depart from the space defined between the second upstream-side fixed roller 22 and the second downstream-side fixed roller 25 while the positional relationship between the second draw-out roller 23 and the second punching stage 27 is kept constant. Thereby, the second ceramic green sheet 3 can be always wound around the second upstream-side fixed roller 22 and the second downstream-side fixed roller 25. Thus, tension applied to the second long ceramic green sheet 3 can be stabilized.

Subsequently, the punching head 8 is moved upward, so that the ceramic green sheet cut piece 5 can be moved to the lamination station 7. The ceramic green sheet cut piece 5 is moved to a position above the lamination stage 11. In the lamination station 7m the lamination stage 11 is raised, so that the ceramic green sheet cut piece 5 is laminated and press-bonded on the lamination stage 11.

Subsequently, in the lamination station 7, the lamination stage 11 is lowered. Thus, the operation state is returned to its original state as shown in FIG. 1A.

Thereafter, the above-described operation is repeated a predetermined number of times, and thereby, a predetermined number of ceramic green sheet cut pieces 6 having no conductor films are laminated 5 to form an outer layer.

While the above-described processing of the long second ceramic green sheet 3 is carried out, the processing of the first long ceramic green sheet 2 is in the rest state. The preparation for the first long ceramic green sheet 2 may be carried out in the rest state.

Thereafter, a ceramic green sheet having a conductor film formed thereon is laminated. Thus, the first long ceramic green sheet 2 is introduced in the direction shown by arrow 40 into the punching station 6 accompanied by the first draw-out roller 19. At this time, the first guide roller 20 and the first punching stage 26 are moved together with the first draw-out roller 19.

The above-described movement of the first draw-out roller 19, the first guide roller 20, and the first punching stage 26 is achieved by the structure described above with reference to FIGS. 3A and 3B. It should be noted that the first bracket 30 through which the first ball screw 31 passes is provided in the central portion in the main plane direction of the first punching stage 26.

According to the above-described structure, effects of the moment can be more suppressed compared to the structure in which the second ball screw 38 passes through the second bracket 37 extending on the side of the second punching stage 27 as shown in FIG. 4. Thus, the above-described structure of the first bracket is suitable for high speed movement. Moreover, the stopping accuracy can be enhanced.

From the standpoint of these advantages, it is significant that the first long ceramic green sheet 2 having a conductor film formed thereon for which higher positional accuracy and a high number of laminated sheets are required is processed by the first draw-out roller 19 and so forth shown in FIGS. 3A and 3B, and on the other hand, the second long ceramic green sheet 3 for which a very high positional accuracy is not required and of which the number of laminated sheets is relatively small is processed by the second draw-out roller 23 and so forth shown in FIG. 4.

Simultaneously with or after the induction of the first long ceramic green sheet 2 into the punching station 6, the first unwinding roller 14 and the take-up roller 15 are driven, so that the first long ceramic green sheet 2 is fed by one pitch. For the purpose of feeding the first ceramic green sheet 2 as described above, the first punching stage 26 may have a function of suction-holding the first ceramic green sheet 2. Thus, the first ceramic green sheet 2 may be fed accompanied by the first punching stage 27.

Thereafter, the cut position of the first ceramic green sheet 2 is sensed with the cameras 42 and 43, and the position of the first long ceramic green sheet 2 is corrected, if necessary.

Subsequently, the punching head 8 is moved from the lamination station 7 to a position above the punching station 6, and then, is moved downward. Thereby, a cutting line enclosing a predetermined area of the first long ceramic green sheet 2 is formed with the cut blade 10.

Then, the first draw-out roller 19 is restored together with the first guide roller 20 and the first punching stage 26 to the waiting position shown in FIG. 1A. Thereby, the first ceramic green sheet 2 recedes from the punching station 6. At this time, the first draw-out roller 19 and the first guide roller 20 are integrally moved while the distance between them is kept constant. Thus, the movement in the longitudinal direction of the first ceramic green sheet 2 does not occur substantially. In other words, the length of the first ceramic green sheet 2 between the unwinding roller 14 and the take-up roller 15 is not changed substantially, and only the shape of the route of the second ceramic green sheet 3 is changed.

In the above-described operation, a ceramic green sheet cut piece 4 (see FIG. 1A), obtained by punching the first long ceramic green sheet 2, is held with a holding block 9 provided for the punching head 8. The carrier film is released from the ceramic green sheet cut piece 4, so that the ceramic green sheet cut piece 4 remains on the punching head 8 side. At this time, the carrier film is wound around the peripheral surface of the first draw-out roller 19. Thus, the release of the carrier film starts from the one-side end of the ceramic green sheet cut piece 4 while the first draw-out roller 19 is moved. Thus, the release of the carrier film can be smoothly carried out.

Referring to the operation of the first guide roller 20, the first guide roller 20 is moved in such a range that the first guide roller 20 does not depart from the space defined between the first upstream-side fixed roller 18 and the first downstream-side fixed roller 21 while the positional relationship between the first draw-out roller 19 and the first punching stage 26 is kept constant. Thereby, the first ceramic green sheet 2 can be always wound around the first upstream-side fixed roller 18 and the first downstream-side fixed roller 21. Thus, tension applied to the first long ceramic green sheet 2 can be stabilized.

Referring to the positional relationship between the first guide roller 20 and the first draw-out roller 19, the first guide roller 20 is positioned between the first draw-out roller 19 and the first punching stage 26, and the positional relationship between the first guide roller 20 and the first draw-out roller 19 is selected so that the winding angle of the first long ceramic green sheet 2 on each of the first guide roller 20 and the first draw-out roller 19 is larger than 180°.

Therefore, slipping between the first long ceramic green sheet 2 and the first guide roller 20 and that between the first long ceramic green sheet 2 and the first draw-out roller 19 can be minimized and prevented. Especially, non-engaging of the rollers, which tends to occur when the speed of the ceramic green sheet moved at a high speed is increased or reduced can be minimized and prevented. Thereby, the lamination apparatus has a constitution that is suitable for high speed movement. Moreover, the stopping accuracy is enhanced.

Subsequently, the punching head 8 is moved upward, so that the ceramic green sheet cut piece 4 can be moved to the lamination station 7. The ceramic green sheet cut piece 4 is moved to a position above the lamination stage 11. In the lamination station 7, the lamination stage 11 is raised, so that the ceramic green sheet cut piece 4 is laminated and press-bonded on the lamination stage 11.

Subsequently, in the lamination station 4, the lamination stage 11 is lowered. Thus, the operation state is returned to its original state as shown in FIG. 1A. The punching head 8 may be moved to a position above the punching station 6, as described above, to prepare for the next punching operation.

Thereafter, the above-described operation is repeated a predetermined number of times, and thereby, a predetermined number of ceramic green sheet cut pieces 4 having conductor films formed thereon, which become internal electrodes for production of electrostatic capacitance, are laminated.

While the above-described processing of the long second ceramic green sheet 2 is carried out, the processing of the second long ceramic green sheet 3 is in the rest state. The preparation for the second long ceramic green sheet 3 may be carried out in the rest state.

Thereafter, a ceramic green sheet without a conductor film being formed thereon which becomes the other outer layer is laminated. For this purpose, the second ceramic green sheet 3 is introduced again in the direction shown by arrow 41 into the punching station 6, accompanied by the second draw-out roller 23, as shown in FIG. 1C. Thereafter, the above-described operation carried out for the second long ceramic green sheet 3 is conducted again. Thereby, a predetermined number of the ceramic green sheet cut pieces 5 without conductor films which form another outer layer are laminated. As a result, a green laminate for production of a laminated ceramic capacitor is obtained.

Thereafter, to produce the laminated ceramic capacitor completely, the green laminate is cut, if necessary, and is fired. An external electrode is formed.

In the above-description, the lamination apparatus 1 is applied for production of a laminated ceramic capacitor. Also, the lamination apparatus 1 may be applied for production of laminated ceramic electronic components other than the laminated ceramic capacitor. Moreover, only a part of the lamination structure of a laminate for use in a laminated ceramic electronic part may be formed by use of the lamination apparatus 1. Accordingly, different modifications may be applied with respect to the first long ceramic green sheets 2 and 3, which are processed by the lamination apparatus 1, and are described below.

For example, first, there may be supposed the case in which both of the long ceramic green sheets 2 and 3 have conductor films, one of the sheets 2 and 3 is a first kind of ceramic green sheet containing a dielectric material, and the other is a second kind of ceramic green sheet also contains a dielectric material. In this case, the ceramic green sheets may be different from the above-described ceramic green sheets in, e.g., their compositions, shapes and sizes such as thicknesses, and so forth. Moreover, if outer layers are necessary, ceramic green sheets for constituting outer layers may be laminated in a separate process.

Second, there may be supposed the case in which neither the first long ceramic green sheet 2 nor the second ceramic green sheet 3 is provided with a conductor film, one of the sheets 2 and 3 is a first kind of ceramic green sheet containing a dielectric material, and the other is a second kind of ceramic green sheet also containing a dielectric material. In this case, a ceramic green sheet having a conductor film formed thereon is laminated in a separate process, if necessary.

Third, there may be supposed the case in which both of the long ceramic green sheets 2 and 3 have conductor films, one of the sheets 2 and 3 is a first kind of ceramic green sheet containing a magnetic material, and the other is a second kind of ceramic green sheet also containing a magnetic material. If outer layers are necessary, the first or second ceramic green sheet is laminated in a separate process.

Moreover, according to the illustrated preferred embodiment, as the first and second feeding mechanisms for the first and second long ceramic green sheets 2 and 3, the unwinding rollers 14 and 16 and the take-out rollers 15 and 17 are used. Other feeding mechanisms may be used.

Furthermore, as the first and second introducing mechanisms for introducing the long ceramic green sheets 2 and 3 into the punching station 6, respectively, the first and second draw-out rollers 19 and 23 are used. Other introducing mechanisms may be used. Moreover, to drive the first and second draw-out rollers 19 and 23, the first and second ball screws driven by the servomotors 32 and 39 are used. Other driving means such as cylinders or the like may be used.

Moreover, according to the above-described preferred embodiment, the first or second ceramic green sheet cut pieces 4 or 5 is cut in the state of the operation shown in FIG. 1B or FIG. 1C, and thereafter, the operation state is returned to the state shown in FIG. 1A very cutting process for the long ceramic green sheet 2 or 3, so that the carrier film is smoothly released from the ceramic green sheet cut piece 4 or 5. However, if it is not required to smoothly release the carrier film, and a lamination process for the same kind of ceramic green sheet cut pieces 4 or 5 is carried out in succession, the same cutting process may be continuously carried out with the long ceramic green sheet 2 or 3 being fed in the longitudinal direction, while the state shown in the FIG. 1B or FIG. 1C is maintained.

According to the above-described preferred embodiment, for the ceramic green sheet cut pieces 4 and 5 formed by punching the first and second long ceramic green sheets 2 and 3, the cutting process and the lamination process are continuously carried out by a predetermined number of times, respectively, due to the lamination structure of a laminate provided for a laminated ceramic electronic component such as a laminated ceramic capacitor to be formed or the like. For example, in some cases, the cutting process for the first long ceramic green sheet 2 and the lamination process for the ceramic green sheet cut piece 4 may be carried out alternately with the cutting process for the second long ceramic green sheet 3 and the lamination process for the ceramic green sheet cut piece 5, depending on the lamination structure of a laminate provided for a laminated ceramic electronic component to be formed.

Also, according to the above-described preferred embodiment, the first and second long ceramic green sheets 2 and 3 are drawn in the X-axial direction, and thus, are introduced in the punching station, respectively. On the other hand, the punching head is moved between the punching station and the lamination station, and thus, is moved in the Y-axial direction perpendicular to the X-axial direction. However, the punching head may be moved in a direction that is not perpendicular to the X-axial direction.

In addition to the above-described modifications, the lamination apparatus of the present invention may be formed so that at least three kinds of long ceramic green sheets can be processed. In this case, at least three kinds of long ceramic green sheets may be arranged in a radial pattern extending from the punching station as a center.

Moreover, according to the above-described preferred embodiment, the punching station 6 is preferably positioned in a space defined between the first upstream-side fixed roller 18 and the first downstream-side fixed roller 21. However, the punching station 6 may be position in the boundary between the space which is defined between the first upstream-side fixed roller 18 and the first downstream-side fixed roller 21, and the space which is defined between the second upstream-side fixed roller 22 and the second downstream-side fixed roller 25. This will be described in the following preferred embodiment.

Figure 5A:
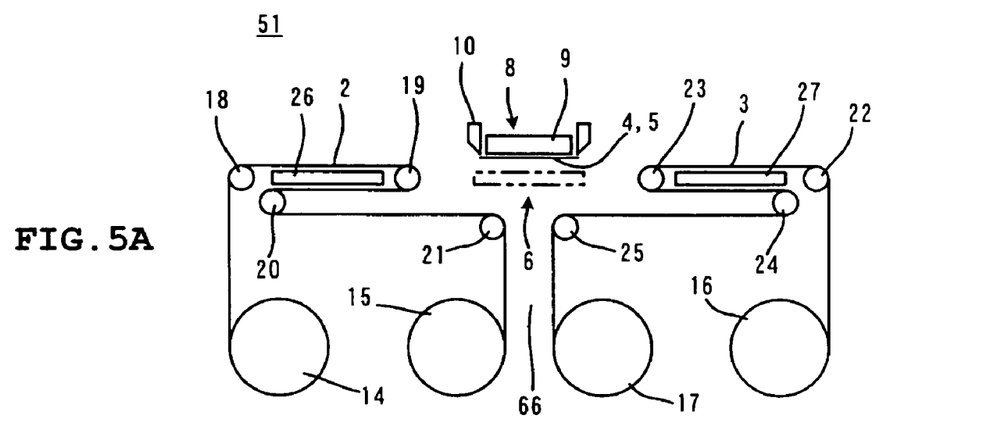
FIGS. 5A to 5C are front views schematically showing the structure of a lamination apparatus 51 for a ceramic green sheet according to a second preferred embodiment of the present invention, in which typical examples of the operation of the lamination apparatus 51 are illustrated, respectively.
Figure 5B:
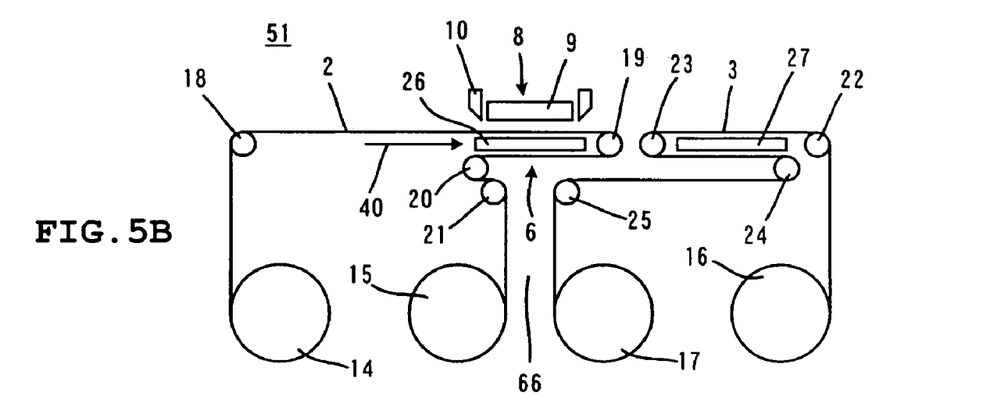
Figure 5C:
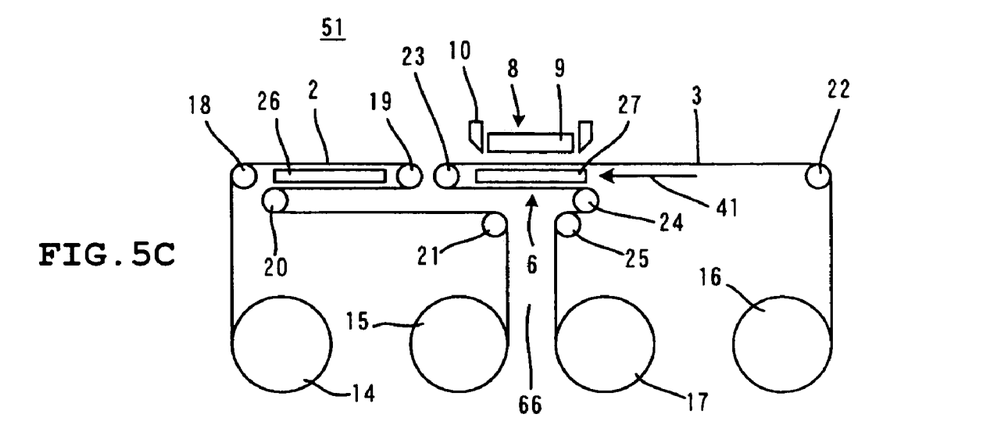
Figure 6:
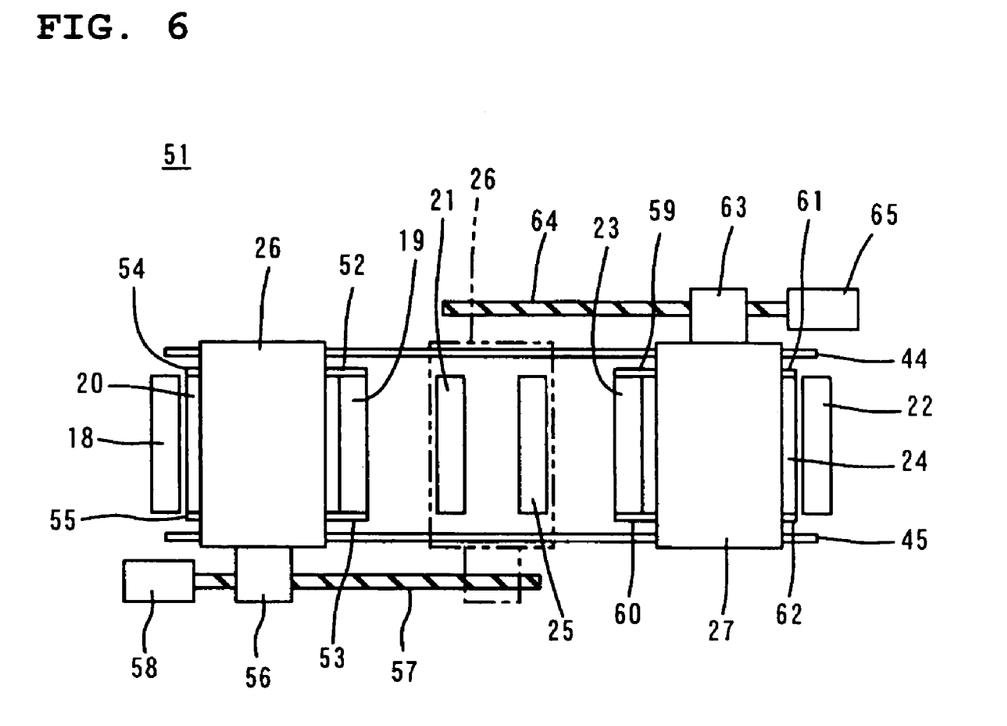
FIG. 6 is a plan view schematically showing the structure of the lamination apparatus 51 shown in FIG. 5 with the lamination station being omitted from the drawing.

FIGS. 5A to 5C are front views showing the configuration of a lamination apparatus 51 for ceramic green sheets according to a second preferred embodiment of the present invention, and are drawings corresponding to the above-described FIGS. 1A to 1C. FIGS. 1A to 1C show typical examples of the states of the operation of the lamination apparatus 51, respectively. FIG. 6 corresponds to FIG. 3A and FIG. 4. In FIGS. 5A to 5C and FIG. 6, the components corresponding to those shown in FIG. 4 are designated by the same reference numerals, and the description thereof is not repeated.

The lamination apparatus 51 according to the second preferred embodiment has such a structure that the first and second long ceramic green sheets 2 and 3 can be processed. The lamination apparatus 51 is provided with one punching station 6. In the punching station 6, ceramic green sheet cut pieces 4 and 5 (shown only in FIG. 5(A)) having predetermined sizes are formed by punching the long ceramic green sheets 2 and 3 in predetermined positions thereof. The lamination station 7 is arranged adjacently to the punching station 6 (not shown in the drawing). Also, the lamination apparatus 51 is provided with one punching head 8.

The above-described punching head 8, the relevant structure, and the operation of the punching head 8 are substantially the same as those of the first preferred embodiment.

The lamination apparatus 51 has first and second feeding mechanisms for feeding the first and second long ceramic green sheets 2 and 3 in the longitudinal direction, respectively. The first feeding mechanism has a first unwinding roller 14, a first take-up roller 15, a first upstream-side fixed roller 18, and a first downstream-side fixed roller 21. The second feeding mechanism has a second unwinding roller 16, a second take-up roller 17, a second upstream-side fixed roller 22, and a second downstream-side fixed roller 25.

The first long ceramic green sheet 2 unwound from the first unwinding roller 14 is sequentially turned along the peripheral surfaces of the first upstream-side fixed roller 18, a first draw-out roller 19, a first guide roller 20, and the first downstream-side fixed roller 21, and thereafter, is wound around the first take-up roller 15.

Moreover, the second long ceramic green sheet 3 unwound from the second unwinding roller 16 is sequentially turned along the peripheral surfaces of the second upstream-side fixed roller 22, a second draw-out roller 23, a second guide roller 24, and the second downstream-side fixed roller 25, and thereafter, is wound around the second take-up roller 17.

A first punching stage 26 is arranged under the first long ceramic green sheet 2 existing in the line between the first upstream-side fixed roller 18 and the first draw-out roller 19. On the other hand, a second punching stage 27 is arranged under the second long ceramic green sheet 3 existing in the line between the second upstream-side fixed roller 22 and the second draw-out roller 23.

The structure and operation relevant to the first and second draw-out rollers 19 and 23 are described with reference to FIG. 6. FIG. 6 shows the lamination apparatus 51 which is in the state of operation shown in FIG. 5A.

Referring to FIG. 6, the first draw-out roller 19 is held by the first punching stage 26 via brackets 52 and 53. The first guide roller 20 is held by the first punching stage 26 via brackets 54 and 55. Moreover, a first bracket 56 is provided for the first punching stage 26 and extends from the central portion of the main surface of the first punching stage 26. A first ball screw 57 is provided so as to pass through the first bracket 56. The first ball screw 57 is rotated by a servomotor 58, and thereby, the first punching stage 26 is moved together with the first draw-out roller 19 and the first guide roller 20 along guide rails 44 and 45 in the X-axial direction. In FIG. 6, the first punching stage 26 after it is moved is shown by an imaginary line.

On the other hand, the second draw-out roller 23 is held by the second punching stage 27 via brackets 59 and 60. The second guide roller 24 is held by the second punching stage 27 via brackets 61 and 62. Moreover, a second bracket 3 is provided for the second punching stage 27 and extends in the side direction thereof. A second ball screw 64 is arranged so as to pass through the second bracket 63. The second ball screw 63 is rotated by a servomotor 65, and thereby, the second punching stage 27 is moved together with the second draw-out roller 23 and the second guide roller 24 along the guide rails 44 and 45 in the X-axial direction.

As shown in FIGS. 5A and 6, the mechanism containing the first punching stage 26 for processing the first long ceramic green sheet 2 and the mechanism containing the second punching stage 27 for processing the second long ceramic green sheet 3 are substantially symmetrical with each other. Thus, these mechanisms can be designed in common, and parts common to these mechanisms can be used.

Hereinafter, the operation of the lamination apparatus 51 will be described.

FIG. 5A shows the initial state of the lamination apparatus 1. In this state, the first and second draw-out rollers 19 and 23 are in the waiting positions. The first and second first long ceramic green sheets 2 and 3 are not introduced in the punching station 6. Moreover, the punching head 8 is positioned in the lamination station 7 provided on the side of the punching station 6.

For example, in the case where the ceramic green sheet cut piece 4 is formed by punching the first long ceramic green sheet 2 and is laminated, the first long ceramic green sheet 2 is introduced into the punching station 6 in the direction shown by arrow 40, accompanied by the first draw-out roller 19 as shown in FIG. 5B. At this time, the first guide roller 20 and the first punching stage 26 are also moved together with the first draw-out roller 19.

Simultaneously with or after the introduction of the first long ceramic green sheet 2 as described above, the first unwinding roller 14 and the first take-up roller 15 are driven, so that the first ceramic green sheet 2 is fed by one pitch.

Then, the punching head 8 is moved from the lamination station to a position above the punching station 6, and thereafter, is moved downward. Thereby, a cutting line enclosing a predetermined area of the first long ceramic green sheet 2 is formed with the cut blade 10.

Subsequently, the first draw-out roller 19, together with the first guide roller 20 and the first punching stage 26, is returned to the waiting position shown in FIG. 5A. Thereby, the first long ceramic green sheet 2 recedes from the punching station 6.

At this time, the ceramic green sheet cut piece 4 formed by punching the first long ceramic green sheet 2 is held by a holding block 9 provided for the punching head 8. On the other hand, the carrier film is released from the ceramic green sheet cut piece 4.

Subsequently, the ceramic green sheet cut piece 4 is transported to the lamination station while the ceramic green sheet cut piece 4 is held by the punching head 8. In the lamination station, the ceramic green sheet cut piece 4 is laminated and press-bonded. Thereafter, the punching head 8 is moved to a position above the punching station 6, and prepares for the next punching operation.

On the other hand, in the case where the ceramic green sheet cut piece 5 is formed by punching the second long ceramic green sheet 3 and is laminated, the second long ceramic green sheet 3 is introduced into the punching station 6 in the direction shown by arrow 41, accompanied by the second draw-out roller 23 as shown in FIG. 5C. At this time, the second guide roller 24 and the second punching stage 27 are also moved together with the second draw-out roller 23.

Simultaneously with or after the introduction of the second long ceramic green sheet 3 as described above, the second unwinding roller 16 and the second take-up roller 17 are driven, so that the second ceramic green sheet 3 is fed by one pitch.

Then, the punching head 8 is moved downward in the punching station 6. Thereby, a cutting line enclosing a predetermined area of the second long ceramic green sheet 3 is formed with the cut blade 10.

Subsequently, the second draw-out roller 23, together with the second guide roller 24 and the second punching stage 26\7, is returned to the waiting position shown in FIG. 5A. Thereby, the second long ceramic green sheet 2 recedes from the punching station 6.

At this time, the ceramic green sheet cut piece 5 formed by punching the second long ceramic green sheet 3 is held by the holding block 9 provided for the punching head 8. On the other hand, the carrier film is released from the ceramic green sheet cut piece 5.

Subsequently, the ceramic green sheet cut piece 5 is conveyed to the lamination station while the ceramic green sheet cut piece 5 is held by the punching head 8. In the lamination station, the ceramic green sheet cut piece 5 is laminated and press-bonded. Thereafter, the punching head 8 is moved to a position above the punching station 6, and prepares for the next punching operation.

The above-described operation is repeated in a predetermined sequence and a predetermined number of times, corresponding to the design of a laminated ceramic electronic component to be produced.

According to the above-described second preferred embodiment, the punching station 6 is positioned in the boundary between the space which is defined between the first upstream-side fixed roller 18 and the first downstream-side fixed roller 21, and the space which is defined between the second upstream-side fixed roller 22 and the second downstream-side fixed roller 25.

According to the second preferred embodiment, the first guide roller 20 is moved within the space defined between the first upstream-side fixed roller 18 and the first downstream-side fixed roller 21. Also, the second guide roller 24 is moved within the space defined between the second upstream-side fixed roller 22 and the second downstream-side fixed roller 25, similarly to the first preferred embodiment.

Due to the above-described configuration, the first long ceramic green sheet 2 can be always set in the state that the sheet 2 winds along the first upstream-side fixed roller 18 and the first downstream-side fixed roller 21. Moreover, the second long ceramic green sheet 3 can be always set in the state that the sheet 3 winds along second upstream-side fixed roller 22 and the second downstream-side fixed roller 25. Therefore, tension applied to the first and second long ceramic green sheets 2 and 3 can be stabilized.

Figure 7:
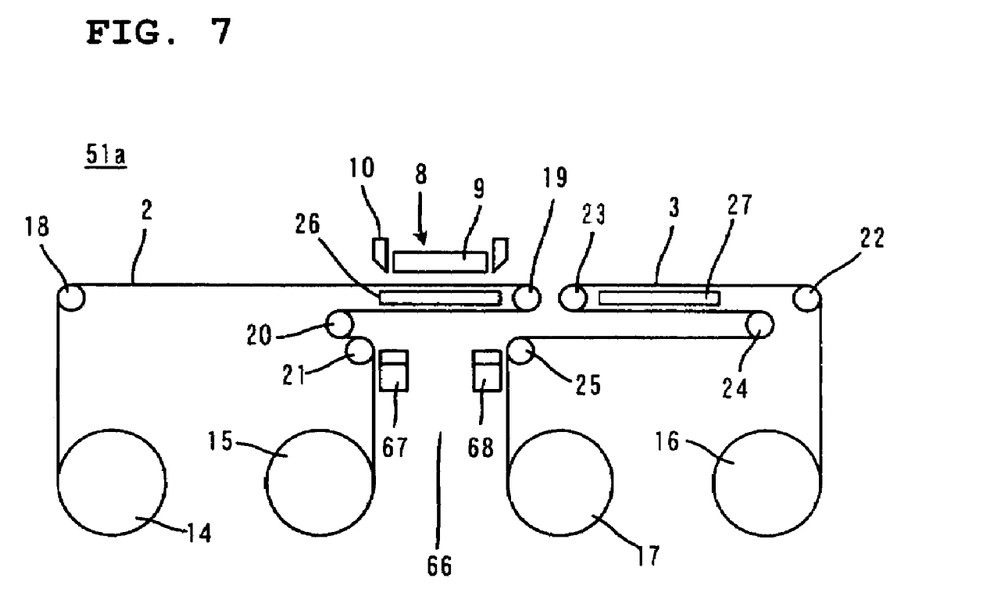
FIG. 7 is a front view schematically showing the structure of a lamination apparatus 51a for a ceramic green sheet according to a third preferred embodiment of the present invention, in which the operation state of the lamination apparatus 51a corresponds to that shown in FIG. 5B.

According to the second preferred embodiment, the punching station 6 is positioned above a space 66 between the first downstream-side fixed roller 21 and the second downstream-side fixed roller 25. FIG. 7 shows a preferred embodiment in which the space 66 is modified so as to be more effectively used.

FIG. 7 is a front view schematically showing the structure of a lamination apparatus 51a according to a third preferred embodiment. FIG. 7 corresponds to FIGS. 5A to 5C, and shows the operation state corresponding to that shown in FIG. 5B. In FIG. 7, the components equivalent to those shown in FIGS. 5A to 5C are designated by the same reference numerals, and the description thereof is not repeated.

According to the third preferred embodiment shown in FIG. 7, characteristically, the space 66 is set to be wider compared to the space in the second preferred embodiment shown in FIGS. 5A to 5C. Thus, the space 66, which is relatively wide, can be used for the disposition of cameras 67 and 68. The cameras 67 and 68 have the same function as that of the cameras 42 and 43 shown in FIG. 1.

The lamination apparatus 51a, in which the space 99 is relatively wide as described above, is modified compared to the lamination apparatus 51 shown in FIGS. 5A to 5C. The modification will be described below.

First, the first downstream-side fixed roller 21, the fist take-up roller 15, the second downstream-side fixed roller 25, and the second take roller 17 are caused to recede from the punching station 6. Simultaneously, the distance between the first draw-out roller 19 and the first guide roller 20 is increased, and also, the distance between the second draw-out roller 23 and the second guide roller 24 is increased. Moreover, the first upstream-side fixed roller 18, the first unwinding roller 14, the second upstream-side fixed roller 22, and the second unwinding roller 16 are caused to recede from the punching station 6.

The positions of the second downstream-side fixed roller 25 and the second take-up roller 17 and so forth can be taken as the positions attained when the above-described recession is large. Thus, if it is unnecessary to increase the space 66, the positions of the first downstream-side fixed roller 21, the first take-up roller 15, and so forth may be the positions shown in FIGS. 1A to 1C.

It should be understood that the foregoing description is only illustrative of the present invention. Various alternatives and modifications can be devised by those skilled in the art without departing from the present invention. Accordingly, the present invention is intended to embrace all such alternatives, modifications and variations that fall within the scope of the appended claims.

What is claimed is:

1. A lamination apparatus for a ceramic green sheet comprising:
    one punching station disposed in a fixed position and adapted to punch a predetermined area of each of a plurality of long ceramic green sheets so as to form a ceramic green sheet cut piece having a predetermined size, and one lamination station disposed in a fixed position adjacent to the punching station and adapted to laminate the ceramic green sheet cut piece, such that a plurality of different types of long ceramic green sheets are processed;
    a single punching head which cuts each of the plurality of long ceramic green sheets in the punching station so as to form a cutting line enclosing the predetermined area thereof, and which conveys the piece from the punching station to the lamination station while holding the formed ceramic green sheet cut piece;
    a feeding mechanism for feeding each of the plurality of long ceramic green sheets in a longitudinal direction of the long ceramic green sheets, respectively; and
    a plurality of introducing mechanisms for selectively introducing respective ones of the plurality of long ceramic green sheets from different directions into the punching station disposed at the fixed position.

2. A lamination apparatus for a ceramic green sheet according to claim 1, wherein each of the plurality of introducing mechanisms is provided with a draw-out roller which is moved so as to draw out one of the plurality of long ceramic green sheets to the punching station while holding the one of the long ceramic green sheet on the peripheral surface thereof.

3. A lamination apparatus for a ceramic green sheet according to claim 2, further comprising a plurality of draw-out rollers and a plurality of punching stages which are positioned on the back side in the draw-out direction of the draw-out rollers and are moved together with the draw-out rollers, a respective one of the plurality of punching stages is positioned in opposition to the punching head via a respective one of the plurality of long ceramic green sheets when the draw-out rollers are moved, so as to draw out each of the plurality of long ceramic green sheets to the punching station, respectively.

4. A lamination apparatus for a ceramic green sheet according to claim 3, wherein as the plurality of long ceramic green sheets, first and second long ceramic green sheets are processed, the draw-out roller includes a first draw-out roller for drawing out the first long ceramic green sheet and a second draw-out roller for drawing out the second long ceramic green sheet, the punching stage includes a first punching stage which is moved together with the first draw-out roller, and a second punching stage which is moved together with the second draw-out roller, the first and second draw-out rollers are movable in an X-axial direction passing through the punching station, and the punching head is movable in a Y-axial direction substantially perpendicular to the X-axial direction.

5. A lamination apparatus for a ceramic green sheet according to claim 4, wherein the feeding mechanism includes:
    a first upstream-side fixed roller provided in a fixed position to guide the first long ceramic green sheet on the upstream side of the first punching stage, and a first downstream-side fixed roller provided in a fixed position to guide the first long ceramic green sheet on the downstream side of the first punching stage; and
    a second upstream-side fixed roller provided in a fixed position to guide the second long ceramic green sheet on the upstream side of the second punching stage, and a second downstream-side fixed roller provided in a fixed position to guide the second long ceramic green sheet on the downstream side of the second punching stage;
    a first guide roller arranged such that the first long ceramic green sheet is always wound along the first upstream-side roller and the first downstream-side fixed roller, and is moved within the space defined between the first upstream-side fixed roller and the first downstream-side fixed roller while a positional relationship between the first draw-out roller and the first punching state is kept constant; and
    a second guide roller arranged such that the second long ceramic green sheet is always wound along the second upstream-side roller and the second downstream-side fixed roller, and is moved within the space defined between the second upstream-side fixed roller and the second downstream-side fixed roller while a positional relationship between the second draw-out roller and the second punching state is kept constant.

6. A lamination apparatus for a ceramic green sheet according to claim 5, wherein the punching station is positioned within the space defined between the first upstream-side roller and the first downstream-side roller.

7. A lamination apparatus for a ceramic green sheet according to claim 6, wherein the first and second draw-out rollers are held on the first and second punching stages, respectively, the first punching stage can be moved by rotation of a first ball screw passing through a first bracket extending from a center portion in a main surface direction thereof, and the second punching stage can be moved by rotation of a second ball screw passing through a second bracket extending from the center portion in a side direction thereof.

8. A lamination apparatus for a ceramic green sheet according to claim 7, wherein the first long ceramic green sheet has a conductor film formed thereon, and the second long ceramic green sheet has no conductor film formed thereon.

9. A lamination apparatus for a ceramic green sheet according to claim 6, wherein the first guide roller is positioned between the first draw-out roller and the first punching stage, and the positional relationship between the first guide roller and the first draw-out roller is such that the winding-around angles of the first long ceramic green sheet at the first guide roller and the first draw-out roller are larger than about 180°, respectively.

10. A lamination apparatus for a green sheet according to claim 5, wherein the punching station is positioned in a boundary between the space which is defined between the first upstream-side fixed roller and the first downstream-side fixed roller, and the space which is defined between the second upstream-side fixed roller and the second downstream-side fixed roller.

11. A lamination apparatus for a ceramic green sheet according to claim 1, further comprising a camera fixedly disposed to sense the cut-position of each of the plurality of long ceramic green sheets introduced in the punching station.

12. A method of laminating a ceramic green sheet comprising the steps of:
selectively introducing each of a plurality of different kinds of long ceramic green sheets from different directions into one punching station that is disposed at a fixed position and having a single punching head;
punching a predetermined area of each of the plurality of long ceramic green sheets to form a ceramic green sheet cut piece having a predetermined size on the punching station;
conveying the ceramic green sheet cut piece from the punching station to a lamination station; and
laminating the ceramic green sheet cut piece in the lamination station.

13. The method according to claim 12, wherein the lamination station is positioned adjacent to the punching station.

14. The method according to claim 12, wherein in the introducing step, a selected one of the plurality of long ceramic green sheets is drawn to the punching station by a draw-out roller which holds the selected one of the plurality of long green ceramic sheets on a peripheral surface thereof.

15. The method according to claim 12, wherein the punching step is carried out on a plurality of punching stages.

16. The method according to claim 15, further comprising the step of moving the plurality of punching stages during the step of punching.

17. The method according to claim 12, wherein the plurality of different kinds of ceramic green sheets include first and second long ceramic green sheets and first and second draw-out rollers are used to introduce and convey the first and second long ceramic green sheets.

18. The method according to claim 12, wherein the punching step includes moving a first punching stage with a first draw-out roller and moving a second punching stage with a second draw-out roller.

19. The method according to claim 12, wherein in the step of punching, the punching station is positioned within a space defined between a first upstream-side roller and a first downstream-side roller.

20. The method according to claim 12, further comprising the step of optically sensing a cut-position of the long ceramic green sheets during the step of punching.

* * * * *